(12) United States Patent
Zierer et al.

(10) Patent No.: US 11,993,707 B2
(45) Date of Patent: *May 28, 2024

(54) POLYMER COMPOSITE CONTAINING RECYCLED CARBON FIBERS

(71) Applicant: Celanese Sales Germany GmbH, Taunus (DE)

(72) Inventors: Dirk Zierer, Hofheim (DE); Patrick Nickolay, Villmar (DE); Tim Feuerstack, Oberursel (DE)

(73) Assignee: CELANESE SALES GERMANY GMBH, Sulzbach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/859,367

(22) Filed: Jul. 7, 2022

(65) Prior Publication Data

US 2022/0332942 A1    Oct. 20, 2022

Related U.S. Application Data

(62) Division of application No. 16/270,780, filed on Feb. 8, 2019, now Pat. No. 11,384,238.

(60) Provisional application No. 62/628,037, filed on Feb. 8, 2018.

(51) Int. Cl.
| | | |
|---|---|---|
| *C08L 67/02* | (2006.01) | |
| *C08J 5/04* | (2006.01) | |
| *C08K 3/04* | (2006.01) | |

(52) U.S. Cl.
CPC .............. *C08L 67/02* (2013.01); *C08J 5/042* (2013.01); *C08K 3/04* (2013.01); *C08J 2367/02* (2013.01); *C08J 2467/02* (2013.01); *C08L 2201/08* (2013.01); *C08L 2205/025* (2013.01); *C08L 2205/12* (2013.01); *C08L 2205/24* (2013.01); *C08L 2310/00* (2013.01)

(58) Field of Classification Search
CPC ................. C08L 67/02; C08L 2201/08; C08L 2205/025; C08L 2205/12; C08L 2205/24; C08L 2310/00; C08J 5/042; C08J 2367/02; C08J 2467/02; C08K 3/04

See application file for complete search history.

(56) References Cited

U.S. PATENT DOCUMENTS

| | | | |
|---|---|---|---|
| 3,908,061 | A | 9/1975 | Byrne et al. |
| 4,161,470 | A | 7/1979 | Calundann |
| 4,364,993 | A | 12/1982 | Edelman et al. |
| 4,444,931 | A | 4/1984 | Lu et al. |
| 4,559,164 | A | 12/1985 | Kostelnik et al. |
| 4,886,847 | A | 12/1989 | Bastioli et al. |
| 5,096,951 | A | 3/1992 | Auerbach |
| 5,508,374 | A | 4/1996 | Lee et al. |
| 5,616,680 | A | 4/1997 | Linstid, III |
| 5,679,733 | A | 10/1997 | Malik et al. |
| 6,114,492 | A | 9/2000 | Linstid, III et al. |
| 6,150,446 | A | 11/2000 | Numata |
| 6,221,962 | B1 | 4/2001 | Heino et al. |
| 6,344,513 | B1 | 2/2002 | Numata |
| 6,414,155 | B1 | 7/2002 | Sassi et al. |
| 6,514,611 | B1 | 2/2003 | Shephard et al. |
| 6,528,572 | B1 | 3/2003 | Patel et al. |
| 6,540,945 | B2 | 4/2003 | Kubotera et al. |
| 6,560,840 | B1 | 5/2003 | Jenkins et al. |
| 6,730,378 | B2 | 5/2004 | Matsuoka et al. |
| 6,730,731 | B2 | 5/2004 | Tobita et al. |
| 7,445,797 | B2 | 11/2008 | Meneghetti et al. |
| 7,608,666 | B2 | 10/2009 | Matsuoka et al. |
| 7,612,130 | B2 | 11/2009 | Kim |
| 7,648,748 | B2 | 1/2010 | Nakane et al. |
| 7,776,410 | B2 | 8/2010 | Nakane et al. |
| 7,825,176 | B2 | 11/2010 | Kim et al. |
| 7,858,172 | B2 | 12/2010 | Imaizumi et al. |
| 7,960,473 | B2 | 6/2011 | Kobayashi et al. |
| 8,034,866 | B2 | 10/2011 | Zhu et al. |
| 8,067,493 | B2 | 11/2011 | Zhu et al. |
| 8,324,307 | B2 | 12/2012 | Harder et al. |
| 8,646,994 | B2 | 2/2014 | Kim et al. |
| 8,658,057 | B2 | 2/2014 | Nakayama et al. |
| 8,683,683 | B2 | 4/2014 | Knoll et al. |
| 8,741,998 | B2 | 6/2014 | l'Abee et al. |
| 8,796,392 | B2 | 8/2014 | Luo et al. |
| 8,834,741 | B2 | 9/2014 | Shiraishi et al. |
| 8,852,487 | B2 | 10/2014 | Feng et al. |

(Continued)

FOREIGN PATENT DOCUMENTS

| | | |
|---|---|---|
| CN | 101343409 | 1/2009 |
| CN | 102408685 | 4/2012 |

(Continued)

OTHER PUBLICATIONS

Abstract of WO Patent WO9515360, Jun. 8, 1995, 1 page.
Abstract of Japanese Patent JPH08134334, May 28, 1996, 2 pages.
Abstract of Japanese Patent JP2000080289, Mar. 21, 2000, 1 page.
Abstract of Japanese Patent JP2000313812, Nov. 14, 2000, 1 page.
Abstract of Japanese Patent JP2000313798, Nov. 14, 2000, 1 page.
Abstract of Japanese Patent JP2005023094, Jan. 27, 2005, 2 pages.
Abstract of Japanese Patent JP2005187809, Jul. 14, 2005, 1 page.
Abstract of Japanese Patent JP2006117731, May 11, 2006, 1 page.
Abstract of Japanese Patent JP2006089701, Jun. 6, 2006, 1 page.
Abstract of EP Patent EP1703234, Sep. 20, 2006, 2 pages.
Abstract of Japanese Patent JP2006327301, Dec. 7, 2006, 2 pages.
Abstract of Japanese Patent JP2006347151, Dec. 28, 2006, 1 page.
Abstract of WO Patent WO2007043701, Apr. 19, 2007, 1 page.
Abstract of Japanese Patent JP2007211211, Aug. 23, 2007, 1 page.
Abstract of Japanese Patent JP2007238851, Sep. 20, 2007, 1 page.

(Continued)

*Primary Examiner* — Angela C Scott
(74) *Attorney, Agent, or Firm* — DORITY & MANNING, P. A.

(57) ABSTRACT

A polymer composition is described well suited for being combined with relatively short fibers. The fibers, for instance, can have a mean fiber length of less than 1,000 microns, such as less than 700 microns, such as less than 500 microns. The polymer formulation allows for intimate mixing with the fibers without having to use a sizing agent. In one embodiment, the composition contains a polybutylene terephthalate polymer combined with a thermoplastic polymer having lower crystallinity.

11 Claims, 1 Drawing Sheet

(56) References Cited

U.S. PATENT DOCUMENTS

| | | | |
|---|---|---|---|
| 8,906,259 B2 | 12/2014 | Kim | |
| 8,926,862 B2 | 1/2015 | Kim et al. | |
| 8,932,483 B2 | 1/2015 | Kim | |
| 8,946,333 B2 | 2/2015 | Raman et al. | |
| 9,062,198 B2 | 6/2015 | Lu | |
| 9,074,070 B2 | 7/2015 | Yung et al. | |
| 9,080,036 B2 | 7/2015 | Luo et al. | |
| 9,090,751 B2 | 7/2015 | Saga et al. | |
| 9,119,307 B2 | 8/2015 | Luo et al. | |
| 9,127,142 B2 | 9/2015 | Luo et al. | |
| 9,284,435 B2 | 3/2016 | Kim | |
| 9,355,753 B2 | 5/2016 | Kim | |
| 9,512,293 B2 | 12/2016 | Kim | |
| 9,512,312 B2 | 12/2016 | Mazahir et al. | |
| 9,862,809 B2 | 1/2018 | Kim et al. | |
| 11,384,238 B2 * | 7/2022 | Zierer | C08L 67/02 |
| 2002/0051874 A1 | 5/2002 | Ishibashi et al. | |
| 2002/0172786 A1 | 11/2002 | Matsuoka et al. | |
| 2003/0060529 A1 | 3/2003 | Ho et al. | |
| 2003/0096070 A1 | 5/2003 | Matsuoka et al. | |
| 2004/0254280 A1 | 12/2004 | Richter et al. | |
| 2005/0186438 A1 | 8/2005 | Alms et al. | |
| 2006/0030659 A1 | 2/2006 | DeStio | |
| 2006/0100330 A1 | 5/2006 | Natarajan et al. | |
| 2007/0073007 A1 | 3/2007 | Harashina | |
| 2007/0182059 A1 | 8/2007 | Ikegawa et al. | |
| 2007/0213458 A1 | 9/2007 | Topoulos | |
| 2008/0009576 A1 | 1/2008 | Alexander et al. | |
| 2008/0167410 A1 | 7/2008 | Shim et al. | |
| 2009/0264562 A1 | 10/2009 | Schellekens et al. | |
| 2010/0197827 A1 | 8/2010 | Kim et al. | |
| 2010/0227143 A1 | 9/2010 | Mulholland | |
| 2010/0297453 A1 | 11/2010 | Maenaka et al. | |
| 2010/0324189 A1 | 12/2010 | Brockmuller et al. | |
| 2012/0232188 A1 | 9/2012 | Nakayama | |
| 2013/0098666 A1 | 4/2013 | Lee | |
| 2013/0119317 A1 | 5/2013 | Kim et al. | |
| 2013/0123420 A1 | 5/2013 | Kim | |
| 2013/0146344 A1 | 6/2013 | Lee et al. | |
| 2013/0156565 A1 | 6/2013 | Feng | |
| 2013/0157780 A1 | 6/2013 | Kim et al. | |
| 2013/0199412 A1 | 8/2013 | Christ et al. | |
| 2014/0004328 A1 | 1/2014 | Kim et al. | |
| 2014/0066564 A1 | 3/2014 | Kaushik et al. | |
| 2014/0154479 A1 | 6/2014 | Yun et al. | |
| 2014/0163156 A1 | 6/2014 | Bienmueller et al. | |
| 2014/0171575 A1 | 6/2014 | Mercx et al. | |
| 2014/0264183 A1 | 9/2014 | Kim | |
| 2014/0272226 A1 | 9/2014 | Kim | |
| 2014/0350163 A1 | 11/2014 | Kim et al. | |
| 2014/0364025 A1 | 12/2014 | Zhang et al. | |
| 2015/0080518 A1 | 3/2015 | Moniruzzaman | |
| 2015/0104165 A1 | 4/2015 | Kim | |
| 2015/0112019 A1 | 4/2015 | Kim et al. | |
| 2015/0175805 A1 | 6/2015 | Schaefer | |
| 2015/0225547 A1 | 8/2015 | Tu et al. | |
| 2015/0274964 A1 | 10/2015 | Washio et al. | |
| 2015/0291776 A1 | 10/2015 | Kim | |
| 2015/0291796 A1 | 10/2015 | Kim | |
| 2015/0368460 A1 | 12/2015 | Sohn et al. | |
| 2016/0053072 A1 | 2/2016 | Yung et al. | |
| 2016/0053107 A1 | 2/2016 | Mazahir et al. | |
| 2016/0053117 A1 | 2/2016 | Nair et al. | |
| 2016/0053118 A1 | 2/2016 | Nair et al. | |
| 2016/0152801 A1 | 6/2016 | Yu et al. | |
| 2016/0185940 A1 | 6/2016 | Kim | |
| 2017/0029596 A1 | 2/2017 | Kim et al. | |
| 2017/0029682 A1 | 2/2017 | Kim et al. | |
| 2017/0051147 A1 | 2/2017 | Kim | |
| 2019/0241735 A1 | 8/2019 | Zierer et al. | |

FOREIGN PATENT DOCUMENTS

| | | |
|---|---|---|
| CN | 102424720 | 4/2012 |
| CN | 102516726 | 6/2012 |
| CN | 102532818 | 7/2012 |
| CN | 102827463 | 12/2012 |
| CN | 102977560 | 3/2013 |
| CN | 103709703 | 4/2014 |
| CN | 103788588 | 5/2014 |
| CN | 103834145 | 6/2014 |
| CN | 103897213 | 7/2014 |
| CN | 104194286 | 12/2014 |
| CN | 104262675 | 1/2015 |
| DE | 102009023529 | 12/2010 |
| DE | 102011079525 | 1/2013 |
| EP | 0468673 | 7/1991 |
| EP | 2562206 | 2/2013 |
| EP | 2860214 | 4/2015 |
| JP | S5590551 | 7/1980 |
| JP | H02167345 | 6/1990 |
| JP | H08208954 | 8/1996 |
| WO | WO 2004/058851 | 7/2004 |
| WO | WO 2013/129338 A1 | 6/2013 |
| WO | WO 2014/087842 A1 | 6/2014 |
| WO | WO 2014/098847 | 6/2014 |
| WO | WO 2015/031573 | 3/2015 |

OTHER PUBLICATIONS

Abstract of Japanese Patent JP2007254716, Oct. 4, 2007, 1 page.
Abstract of Japanese Patent JP2007254717, Oct. 4, 2007, 1 page.
Abstract of Japanese Patent JP2007277292, Oct. 25, 2007, 1 page.
Abstract of Chinese Patent CN101305056, Nov. 12, 2008, 1 page.
Abstract of Japanese Patent JP4600015, Dec. 15, 2010, 1 page.
Abstract of Japanese Patent JP4600016, Dec. 15, 2010, 1 page.
Abstract of Japanese Patent JP2011137064, Jul. 14, 2011, 1 page.
Abstract of Japanese Patent JP2012251130, Dec. 20, 2012, 2 pages.
Abstract of Japanese Patent JP2013014781, Jan. 24, 2013, 1 page.
Abstract of Japanese Patent JP2015000949, Jan. 5, 2015, 1 page.
Abstract of Japanese Patent JP2015021110, Feb. 2, 2015, 1 page.
Abstract of Korean Patent KR20150011768, Feb. 2, 2015, 1 page.
Abstract of Chinese Patent CN104341721, Feb. 11, 2015, 1 page.
Abstract of Taiwanese Patent TW201522578, Jun. 16, 2015, 2 pages.
Product Bulletin for Boron Nitride Powder from Momentive, Sep. 2012, 2 pages.
Product Bulletin for PolarTherm Boron Nitride Powder from Momentive, Sep. 2012, 2 pages.
Material Property Data for DuPont Elvaloy® PTW Ethylene/N-Butyl Acrylate/Glycidyl Methacrylate Copolymer from E. I. du Pont de Nemours and Company, Inc., Aug. 10, 2015, 2 pages.
Product Data Sheet for Elvaloy® resins from E. I. du Pont de Nemours and Company, Inc., Jun. 8, 2015, 3 pages.
Product Information on Lotader® AX8840 from Arkema, Apr. 2014, 2 pages.
Material Safety Data Sheet on Lotader® AX8840 from Arkema, Jul. 11, 2011, 8 pages.
Machine Translation of Chinese Patent CN101305056, Nov. 12, 2008, 13 pages.
Machine Translation of Chinese Patent CN104040422, Sep. 10, 2014, 20 pages.
Product Information on Doverphos S-9228, Solid Phosphite Antioxidant, Dover Chemical Corporation, Jul. 19, 2012, 1 page.
Mercx, et al.: Thermally conductive flame retardant polymer compositions and use thereof; Jun. 2014; SABIC Innovative Plastics Ip B.V., Neth; Chem Asbtract 161:86661 (5 of 6 Caplus of the new search, 15221699 STN-CPC1).
Zhang et al; A polyamide molding composition; Jul. 29, 2015; Kingfa /science and Technology Co., Ltd. Peop. Rep. China; Chem Abstract 163: 271487 (5/8 reference in U.S. Appl. No. 15/221,699 STN-CPC).
Technical Data Sheet for Irgafos® 126, BASF, Jul. 2010 Rev. 1.
Technical Data Sheet for Irganox® 1010, BASF, Jul. 2010 Rev. 1.
Technical Information for CF treated/preprocessed, AKRO-PlasticGmbh, Apr. 30, 2015.

(56) References Cited

OTHER PUBLICATIONS

PCT/IB2019/051035 International Search Report, dated Jun. 27, 2019, 13 pages.

* cited by examiner

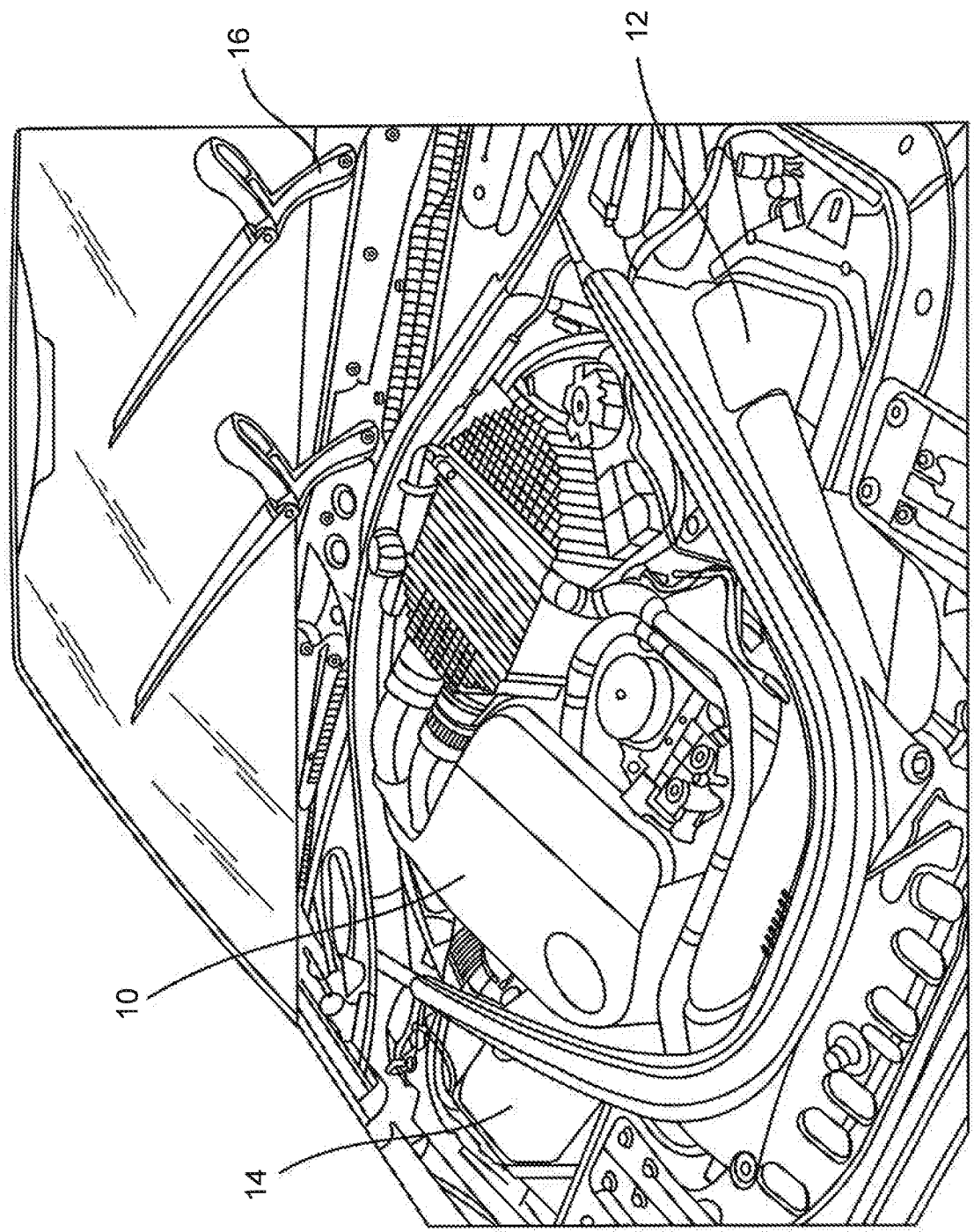

POLYMER COMPOSITE CONTAINING RECYCLED CARBON FIBERS

RELATED APPLICATIONS

The present application is based upon and claims priority to U.S. patent application Ser. No. 16/270,780, having a filing date of Feb. 8, 2019, which is based upon and claims priority to U.S. Provisional Application Ser. No. 62/628,037, having a filing date of Feb. 8, 2018, which are both incorporated herein by reference in their entirety.

BACKGROUND

Engineering thermoplastics are often reinforced with fibrous fillers in order to increase the modulus of parts and products made from the reinforced composition. Adding fibers to thermoplastics can also increase the tensile strength of the materials. Increasing the tensile strength increases the maximum force necessary for the part or product to break.

Recently, the automotive industry has focused on making many automotive parts from carbon fiber composites in order to reduce weight. In order to make many of these parts, a carbon fiber fabric, scrim or mat is first assembled and then impregnated with a reactive resin (e.g. epoxy, unsaturated polyester, etc.), which is later cured. The resulting parts made from the material are not only lightweight, but have excellent physical properties. Lowering the weight of the overall vehicle can significantly improve fuel economy standards.

Unfortunately, however, the process produces a significant amount of carbon fiber scrap. For instance, in some processes, from about 10% to even over 50% of the carbon fiber is in the form of scrap.

In order to recycle the unused carbon fibers, the carbon fiber scrap is typically fed through a process that reduces the scrap to individual carbon fibers. For instance, in one embodiment, the scrap may be fed through a hammer mill in order to achieve fiber separation. The fiber separation process, however, can significantly reduce the fiber length and can fracture the fibers.

Problems have been experienced in the past in incorporating the recycled carbon fibers into a thermoplastic matrix that has the desired balance of properties. For instance, thermoplastic composites made from recycled carbon fibers may have relatively high tensile strength properties but may have relatively low elongation at break properties. The elongation at break properties, for instance, may be undesirably low due to the fiber damage that occurs during recycling and due to a weak fiber-matrix adhesion. In order to improve the fiber-matrix adhesion, a sizing agent may be applied to the fibers. Using a sizing agent, however, not only makes the process more labor and energy intensive, but also can make the price of products made from the process exorbitantly high.

In view of the above, a need exists for a polymer composition and process that incorporates recycled carbon fibers and produces parts and articles having a desired balance of physical properties.

SUMMARY

In general, the present disclosure is directed to polymer compositions capable of being combined with relatively short fibers, such as recycled carbon fibers. The fibers can be incorporated into the composition in order to produce articles and parts with good mechanical properties and without having to treat the fibers with a sizing agent.

In one embodiment, the present disclosure is directed to a reinforced polymer composition containing at least one polyester polymer. In one embodiment, for instance, the polymer composition contains a first polyester polymer combined with or blended with a second polyester polymer. In accordance with the present disclosure, the second polyester polymer can be less crystalline than the first polyester polymer. For instance, in one embodiment, the first polyester polymer may have a crystallinity of greater than about 38%, such as greater than about 40%, such as greater than about 45%. The second polyester polymer, on the other hand, may have a crystallinity of less than about 40%, such as less than about 38%, such as less than about 35%, such as less than 32%. The first polyester polymer may be present in the composition in an amount of at least about 20% by weight, such as in an amount of at least about 30% by weight, such as in an amount of at least about 40% by weight. The first polyester polymer is generally present in an amount less than about 90% by weight, such as in an amount less than about 85% by weight, such as in an amount less than about 80% by weight, such as in an amount less than about 70% by weight. When present, the second polyester polymer can be contained in the composition in an amount from 5% to about 40% by weight.

In accordance with the present disclosure, the one or more polyester polymers are combined with carbon fibers, such as recycled carbon fibers. The carbon fibers can have a mean fiber length of from about 10 microns to about 1,000 microns, such as from about 50 microns to about 700 microns, such as from about 50 microns to about 400 microns. For example, the mean fiber length before compounding may be less than about 700 microns, such as less than about 500 microns, and also greater than about 100 microns. After compounding, the mean fiber length may be, for example, less than about 500 microns, such as less than about 400 microns, such as less than about 200 microns and generally greater than 50 microns.

The carbon fibers can be present in the polymer composition in an amount from about 5% to about 50% by weight, such as in an amount from about 10% to about 44% by weight. In one embodiment, the carbon fibers are substantially free of a sizing agent. For instance, in one embodiment, the carbon fibers may be untreated and contain no sizing agent.

The first polyester polymer present in the composition may comprise a polybutylene terephthalate polymer. As stated above, in one embodiment, the polymer composition may contain a second polyester polymer having lower crystallinity. The second polyester polymer, for instance, may comprise a polybutylene terephthalate, a polyethylene terephthalate, or a copolyester.

In one embodiment, the reinforced polymer composition of the present disclosure comprises a blend of at least one polyester polymer, carbon fibers such as recycled carbon fibers, a fatty acid ester such as an ester of montanic acid, a nucleant such as talc, a heat stabilizing agent, and an antioxidant. The heat stabilizer may comprise a diphosphite or triphosphite. The antioxidant may comprise a sterically hindered phenolic compound.

The polymer composition may be compounded by any compounding method known in the art, such as melt blending, mixing, extruding, or other such methods, used alone or in combination.

An almost limitless variety of different products and parts can be made from the polymer composition of the present disclosure. For example, the polymer composition is particularly well suited to producing housings that comprise a molded polymer article made from the polymer composition. The housing may have a shape configured to enclose an adjacent structure. The housing, for instance, may comprise a housing for a motor. When formed into a housing, the housing is particularly well suited for being used as an automotive part in the engine compartment or elsewhere in the vehicle. In one embodiment, for instance, the housing may be part of a wiper blade assembly.

The polymer composition used to produce the housings can have a tensile strength of greater than about 110 MPa, such as greater than about 120 MPa, such as greater than about 130 MPa, such as greater than about 140 MPa. The polymer composition can have a tensile modulus of greater than about 12,000 MPa, such as greater than about 12,500 MPa, such as greater than about 13,000 MPa, such as greater than about 14,000 MPa. The polymer composition may also exhibit an elongation at break of greater than about 2%, such as greater than about 2.5%, such as greater than about 3%, such as greater than about 3.5%, such as greater than about 4%.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which:

FIG. 1 is a perspective view of a vehicle engine illustrating various molded polymer parts that may be made in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

The present disclosure is generally directed to fiber reinforced polymer compositions containing relatively short reinforcing fibers. The polymer composition of the present disclosure, for instance, is particularly well suited to incorporating recycled carbon fibers into the polymer matrix. Of particular advantage, the polymer composition of the present disclosure can synergistically combine with the carbon fibers in a manner that produces products having a good combination of physical properties without having to apply a sizing agent to the fibers.

In general, the polymer composition of the present disclosure contains at least one polyester polymer blended with relatively short fibers. The fibers, for instance, can have a mean fiber length of less than about 1,000 microns, such as less than about 700 microns, such as less than about 500 microns, such as less than about 400 microns, such as even less than about 100 microns. The fibers generally have a length of greater than about 10 microns, such as greater than about 50 microns. For example, the mean fiber length before compounding may be less than about 700 microns, such as less than about 500 microns, and also greater than about 100 microns. After compounding, the mean fiber length may be, for example, less than about 500 microns, such as less than about 400 microns, such as less than about 200 microns.

As used herein, the mean fiber length is determined generally according to ISO Test No. 22314 (First Edition, May 1, 2006). However, as used herein, the fiber length is determined semi-automatically. In particular, magnified images according to Section 6.3 of ISO Test 22314 are captured with a high resolution scanner and analyzed using IMAGE PRO PLUS picture analysis software. Three to five frames are evaluated for each sample. The determination of the length of the individual fibers is done in an automated way by the above software.

The at least one polyester polymer comprises a polybutylene terephthalate. In one embodiment, the polybutylene terephthalate is combined with a second thermoplastic polymer. The second thermoplastic polymer may also comprise a polyester polymer. The second thermoplastic polymer has a lower crystallinity than the polybutylene terephthalate. The polymer composition can also contain various other components such as a nucleant, a fatty acid ester, and one or more stabilizing agents and/or antioxidants.

The polymer composition of the present disclosure is well suited to being formed into various different polymer articles, including parts and products. In one embodiment, for instance, the polymer composition may be used to produce automotive parts, such as housings.

Referring to FIG. 1, for instance, various polymer articles made in accordance with the present disclosure are shown. For example, in one embodiment, the polymer composition can be used to produce housings 10, 12 and 14. The housings have a shape so as to enclose an adjacent structure. In FIG. 1, for instance, housing 10 comprises an engine cover.

In other embodiments, the housing can be used to enclose a motor or other component. In one embodiment, for instance, as shown in FIG. 1, the housing 16 can be part of a wiper blade assembly. The housing can be used to cover the motor of the wiper blade or can be used to cover a portion of the wiper blade itself.

In still another embodiment, the housing may be used to cover a motor of a power window assembly.

When used to construct a housing as described above, the polymer composition of the present disclosure can have a desired balance of properties. For instance, the polymer composition can have a tensile strength of greater than about 110 MPa, such as greater than about 120 MPa, such as greater than about 130 MPa, such as greater than about 140 MPa, such as greater than about 150 MPa, such as even greater than about 180 MPa, or even greater than about 200 MPa. The tensile strength of the polymer composition is generally less than about 350 MPa. The polymer composition can have a tensile modulus of greater than about 12,000 MPa, such as greater than about 12,500 MPa, such as greater than about 13,000 MPa, such as greater than about 14,000 MPa, such as greater than about 15,000 MPa, such as greater than about 16,000 MPa, such as greater than about 17,000 MPa, such as greater than about 18,000 MPa, such as even greater than about 20,000 MPa. The tensile modulus is generally less than about 40,000 MPa, such as less than about 35,000 MPa. Of particular advantage, the polymer composition can have the above tensile strength and tensile modulus properties while having desired elongation properties. For instance, the polymer composition may display an elongation at break of greater than about 2%, such as greater than about 2.3%, such as greater than about 2.5%, such as greater than about 2.8%, such as greater than about 3%, such as greater than about 3.5%, such as even greater than about 4%. The elongation at break is generally less than about 10%, such as less than about 8%.

In one embodiment, the composition comprises a first polyester polymer and a second polyester polymer having a lower crystallinity than the first polyester polymer. It has been found that incorporating a second, less crystalline polyester to a composition containing a first, more crystalline polyester and carbon fibers improves the mechanical properties of the composition. Of particular advantage, when this combination is used, the mechanical properties of a carbon fiber reinforced polyester can be improved without the use of a sizing agent on the carbon fibers.

The polyesters which are suitable for use herein are derived from an aliphatic or cycloaliphatic diol, or mixtures thereof, containing from 2 to about 10 carbon atoms and an aromatic dicarboxylic acid, i.e., polyalkylene terephthalates.

The polyesters which are derived from a cycloaliphatic diol and an aromatic dicarboxylic acid are prepared by condensing either the cis- or trans-isomer (or mixtures thereof) of, for example, 1,4-cyclohexanedimethanol with the aromatic dicarboxylic acid.

Examples of aromatic dicarboxylic acids include isophthalic or terephthalic acid, 1,2-di(p-carboxyphenyl)ethane, 4,4'-dicarboxydiphenyl ether, etc., and mixtures of these. All of these acids contain at least one aromatic nucleus. Fused rings can also be present such as in 1,4- or 1,5- or 2,6-naphthalene-dicarboxylic acids. In one embodiment, the dicarboxylic acid is terephthalic acid or mixtures of terephthalic and isophthalic acid.

Polyesters that may be used in the polymer composition, for instance, include polyethylene terephthalate, polybutylene terephthalate, mixtures thereof and copolymers thereof.

As described above, the composition may comprise a first polyester and a second polyester with a lower crystallinity than the first polyester. For example, the first polyester may have a crystallinity greater than about 40%, such as greater than about 45%. The second, less crystalline polyester may have a crystallinity less than about 40%, such as less than about 35%.

Percent crystallinity may be determined using differential scanning calorimetry (DSC). Such analysis may be performed using a Pyris 6 DSC from PerkinElmer instruments. A detailed description of the calculation is available from Sichina, W. J. "DSC as problem solving tool: measurement of percent crystallinity of thermoplastics." Thermal Analysis Application Note (2000).

Those skilled in the art will appreciate that the degree of crystallinity of a given polyester may depend upon the monomers used to form the polymer, the process temperatures during formation of the polymer, the process used to make the polymer, and/or the molecular structure of the polyester. In one embodiment, the degree of crystallinity of a polyester can be altered by changing the amount and/or type and/or distribution of monomer units that make up the polyester chain. For example, if about 3 to about 15 mole percent of the ethylene glycol repeat units in poly ethylene terephthalate are replaced with 1,4-cydohexanedimethanol repeat units, or by di-ethylene glycol repeat units, the resulting modified polyester can be amorphous and has a low melt processing temperature. Similarly, if about 10 to about 20 mole percent of the terephthalic acid repeat units in polyethylene terephthalate (or polybutylene terephthalate) are replaced with isophthalic acid repeat units, the resulting modified polyester can also be amorphous and have a melt processing temperature. Such concepts can also be combined into one polyester or by melt mixing at least two different polyesters. Accordingly, the choice of a particular modifying acid or diol can significantly affect the melt processing properties of the polyester.

As used herein, the terms "modifying acid" and "modifying diol" are meant to define compounds, which can form part of the acid and diol repeat units of a polyester, respectively, and which can modify a polyester to reduce its crystallinity or render the polyester amorphous. In one embodiment, however, the polyesters present in the polymer composition of the present disclosure are non-modified and do not contain a modifying acid or a modifying diol.

Examples of modifying acid components may include, but are not limited to, isophthalic acid, phthalic acid, 1,3-cyclohexanedicarboxylic acid, 1,4-cyclohexane dicarboxylic acid, 2,6-naphthaline dicarboxylic acid, succinic acid, glutaric acid, adipic acid, sebacic acid, suberic acid, 1,12-dodecanedioic acid, and the like. In practice, it is often preferable to use a functional acid derivative thereof such as the dimethyl, diethyl, or dipropyl ester of the dicarboxylic acid. The anhydrides or acid halides of these acids also may be employed where practical. Preferred is isophthalic acid.

Examples of modifying diol components may include, but are not limited to, neopentyl glycol, 1,4-cyclohexanedimethanol, 1,2-propanediol, 1,3-propanediol, 2-Methy-1,3-propanediol, 1,4-butanediol, 1,6-hexanediol, 1,2-cyclohexanediol, 1,4-cyclohexanediol, 1,2-cyclohexanedimethanol, 1,3-cyclohexanedimethanol, 2,2,4,4-tetramethyl 1,3-cyclobutane diol, Z,8-bis(hydroxymethyltricyclo-[5.2.1.0]-decane wherein Z represents 3, 4, or 5; 1,4-Bis(2-hydroxyethoxy)benzene, 4,4'-Bis(2-hydroxyethoxy) diphenylether [Bis-hydroxyethyl Bisphenol A], 4,4'-Bis(2-hydroxyethoxy)diphenylsulfide [Bis-hydroxyethyl Bisphenol S] and diols containing one or more oxygen atoms in the chain, e.g. diethylene glycol, triethylene glycol, dipropylene glycol, tripropylene glycol, and the like. In general, these diols contain 2 to 18, preferably 2 to 8 carbon atoms. Cycloalphatic diols can be employed in their cis or trans configuration or as mixtures of both forms.

Other suitable low melt processing polyesters are based on polyaddition of lactones, for example poly-ε-caprolacton.

The at least one polyester or copolyester present in the composition can generally have an intrinsic viscosity (IV) of from about 0.5 to about 0.9 dL/g, such as from about 0.5 to about 0.8 dL/g. In one embodiment, for instance, the intrinsic viscosity of the polyester is from about 0.65 to about 0.8 dL/g.

The at least one polyester is present in the polymer composition in an amount sufficient to form a continuous phase. For example, the polyester may be present in the polymer composition in an amount of at least about 25% by weight, such as in an amount of at least about 30% by weight, such as in an amount of at least 35% by weight, such as in an amount of at least about 40% by weight, such as at least about 50% by weight, such as at least about 60% by weight. The thermoplastic polymer is generally present in an amount less than about 95% by weight.

When using a first polyester and a second polyester having a lower crystallinity than the first polyester, the first polyester may be present in an amount greater than about 25% by weight, such as greater than about 40% by weight. The first polyester is generally present in an amount less than about 93% by weight. The second polyester may be present in an amount less than 50% by weight, such as less than 40% by weight, preferably between about 2% to about 35% by weight.

In a particularly preferred embodiment, the first polyester is polybutylene terephthalate (PBT) and the second, less crystalline polyester is polyethylene terephthalate (PET).

The polybutylene terephthalate may have a crystallinity of greater than about 38%, such as greater than about 40%, such as greater than about 45%. The crystallinity of the polybutylene terephthalate is generally less than about 70%. The polyethylene terephthalate, on the other hand, can have a crystallinity of less than about 40%, such as less than about 38%, such as less than about 35%, such as less than 32%. The crystallinity of the polyethylene terephthalate is generally greater than 0%, such as greater than 5%.

The polymer composition can also have excellent impact resistance. For instance, when tested according to the notched Charpy test at 23° C., the polymer composition may have an impact resistance of at least about 25 kJ/m$^2$, such as at least about 30 kJ/m$^2$, such as at least about 35 kJ/m$^2$, such as at least about 40 kJ/m$^2$, such as at least about 45 kJ/m$^2$, such as at least about 50 kJ/m$^2$ (generally less than 65 kJ/m$^2$, such as less than 60 kJ/m$^2$). It has been surprisingly found that when a less crystalline polyester is incorporated into a composition including a more crystalline polyester and carbon fibers, the impact strength is improved.

In accordance with the present disclosure, a composition is provided which includes a blend of a first polyester and a second less crystalline polyester present in a weight ratio in the range of about 50:1 to 5:7, preferably between about 5:1 and 3:4, even more preferably between about 5:1 to 8:5, said blend of first polyester and second polyester present in a concentration in the ratio of between about 55% and 95% by weight, preferably between about 60% and 90% by weight based on the total weight of the composition. The composition includes carbon fibers generally in an amount greater than about 5% by weight, such as in an amount greater than about 8% by weight, such as in an amount greater than about 10% by weight, such as in an amount greater than about 12% by weight, such as in an amount greater than about 15% by weight. The carbon fibers are present in the polymer composition generally in an amount less than about 45% by weight, such as in an amount less than about 40% by weight, such as in an amount less than about 35% by weight, such as in an amount less than about 30% by weight.

The carbon fibers present in the composition can be recycled carbon fibers. For example, carbon fibers which have been formed into a carbon fiber fabric, but which have not been impregnated by a polymer, may be broken down into individual carbon fibers, especially short carbon fibers. An example of a process for recycling carbon fibers into short carbon fiber lengths is disclosed by German Patent Application DE 102009023529, which is incorporated herein by reference.

The carbon fibers present in the composition can be short carbon fibers having a mean fiber length up to about 1,000 microns. In one embodiment, the carbon fibers have a mean fiber length of up to about 700 microns, such as between about 50 microns and 500 microns. For example, the mean fiber length before compounding may be less than about 700 microns, such as less than about 500 microns, and also greater than about 100 microns. After compounding, the mean fiber length may be, for example, less than about 500 microns, such as less than about 400 microns, such as less than about 300 microns. In another embodiment, carbon fibers having a mean length from about 50 to about 500 microns and are present in the composition in an amount from about 8% to about 35% by weight based on the total weight of the composition.

In addition to the at least one polyester and the carbon fibers, the composition may also contain any number of desired additives.

For example, the composition may further include a nucleating agent, present in a concentration of between about 0.1 and 2% by weight, preferably between about 0.001% and 0.5% based on the total weight of the composition. The nucleating agent can be selected from the group consisting of alkali metal salts having anions which are oxides of the elements from Group IV of the Periodic Table; barium sulfate; and talc.

The polymer composition may also contain at least one stabilizer. The stabilizer may comprise an antioxidant, a light stabilizer such as an ultraviolet light stabilizer, a thermal stabilizer, and the like.

Sterically hindered phenolic antioxidant(s) may be employed in the composition. Examples of such phenolic antioxidants include, for instance, calcium bis(ethyl 3,5-di-tert-butyl-4-hydroxybenzylphosphonate) (Irganox® 1425); terephthalic add, 1,4-dithio-,S,S-bis(4-tert-butyl-3-hydroxy-2,6-dimethylbenzyl) ester (Cyanox® 1729); triethylene glycol bis(3-tert-butyl-4-hydroxy-5-methylhydrocinnamate); hexamethylene bis(3,5-di-tert-butyl-4-hydroxyhydrocinnamate (Irganox® 259); 1,2-bis(3,5,di-tert-butyl-4-hydroxyhydrocinnamoyl)hydrazide (Irganox® 1024); 4,4'-di-tert-octyldiphenamine (Naugalube® 438R); phosphonic acid, (3,5-6-tert-butyl-4-hydroxybenzyl)-,dioctadecyl ester (Irganox® 1093); 1,3,5-trimethyl-2,4,6-tris(3',5'-di-tert-butyl-4' hydroxybenzyl)benzene (Irganox® 1330); 2,4-bis (octylthio)-6-(4-hydroxy-3,5-di-tert-butylanilino)-1,3,5-triazine (Irganox® 565); isooctyl 3-(3,5-di-tert-butyl-4-hydroxyphenyl)propionate (Irganox® 1135); octadecyl 3-(3,5-di-tert-butyl-4-hydroxyphenyl)propionate (Irganox® 1076); 3,7-bis(1,1,3,3-tetramethylbutyl)-10H-phenothiazine (Irganox® LO 3); 2,2'-methylenebis(4-methyl-6-tert-butylphenol)monoacrylate (Irganox® 3052); 2-tert-butyl-6-[1-(3-tert-butyl-2-hydroxy-5-methylphenypethyl]-4-methylphenyl acrylate (Sumilizer® TM 4039); 2-[1-(2-hydroxy-3,5-di-tert-pentylphenylethyl]-4,6-di-tert-pentylphenyl acrylate (Sumilizer® GS); 1,3-dihydro-2H-Benzimidazole (Sumilizer® MB); 2-methyl-4,6-bis[(octylthio)methyl]phenol (Irganox® 1520); N,N'-trimethylenebis-[3-(3,5-di-tert-butyl-4-hydroxyphenyl)propionamide (Irganox® 1019); 4-n-octadecyloxy-2,6-diphenylphenol (Irganox® 1063); 2,2'-ethylidenebis[4,6-di-tert-butylphenol] (Irganox® 129); N N'-hexamethylenebis(3,5-di-tert-butyl-4-hydroxyhydrocinnamamide) (Irganox® 1098); diethyl (3,5-di-tert-butyl-4-hydroxybenxyl)phosphonate (Irganox® 1222); 4,4'-di-tert-octyldiphenylamine (Irganox® 5057); N-phenyl-1-napthalenamine (Irganox® L 05); tris[2-tert-butyl-4-(3-tertbutyl-4-hydroxy-6-methylphenylthio)-5-methyl phenyl] phosphite (Hostanox® OSP 1); zinc dinonyidithiocarbamate (Hostanox® VP-ZNCS 1); 3,9-bis(1,1-diimethyl-2-[(3-tert-butyl-4-hydroxy-5-methylphenyl)propionyloxy]ethyl]-2,4,8,10-tetraoxaspiro[5.5]undecane (Sumilizer® AG80); pentaerythrityl tetrakis[3-(3,5-di-tert-butyl-4-hydroxyphenyl) propionate] (Erganox® 1010); ethylene-bis(oxyethylene)bis[3-(5-tert-butyl-4-hydroxy-m-tolyl)-propionate (Irganox® 245); 3,5-di-tert-butyl-4-hydroxytoluene (Lowinox BHT, Chemtura) and so forth.

Some examples of suitable sterically hindered phenolic antioxidants for use in the present composition are triazine antioxidants having the following general formula:

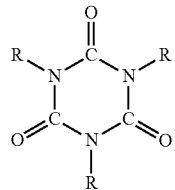

wherein, each R is independently a phenolic group, which may be attached to the triazine ring via a $C_1$ to $C_5$ alkyl or an ester substituent. Preferably, each R is one of the following formula (I)-(III):

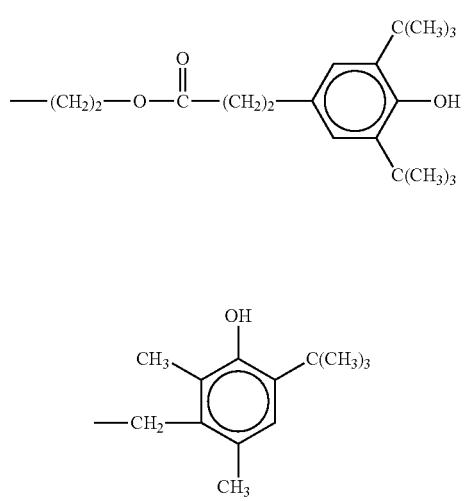

Commercially available examples of such triazine-based antioxidants may be obtained from American Cyanamid under the designation Cyanox® 1790 (wherein each R group is represented by the Formula III) and from Ciba Specialty Chemicals under the designations Irganox® 3114 (wherein each R group is represented by the Formula I) and Irganox® 3125 (wherein each R group is represented by the Formula II).

Sterically hindered phenolic antioxidants may constitute from about 0,01 wt. 9/0 to about 3 wt. %, in some embodiments from about 0.05 wt. % to about 1 wt. %, and in some embodiments, from about 0.05 wt. % to about 0.1 wt. % of the entire stabilized polymer composition. In one embodiment, for instance, the antioxidant comprises pentaerythrityl tetrakis[3-(3,5-di-tert-butyl-4-hydroxyphenyl)propionate.

Hindered amine light stabilizers ("HALS") may be employed in the composition to inhibit degradation of the polyester composition and thus extend its durability. Suitable HALS compounds may be derived from a substituted piperidine, such as alkyl-substituted piperidyl, piperidinyl, piperazinone, alkoxypiperidinyl compounds, and so forth. For example, the hindered amine may be derived from a 2,2,6,6-tetraalkylpiperidinyl. Regardless of the compound from which it is derived, the hindered amine is typically an oligomeric or polymeric compound having a number average molecular weight of about 1,000 or more, in some embodiments from about 1000 to about 20,000, in some embodiments from about 1500 to about 15,000, and in some embodiments, from about 2000 to about 5000. Such compounds typically contain at least one 2,2,6,6-tetraalkylpiperidinyl group (e.g., 1 to 4) per polymer repeating unit.

Without intending to be limited by theory, it is believed that high molecular weight hindered amines are relatively thermostable and thus able to inhibit light degradation even after being subjected to extrusion conditions. One particularly suitable high molecular weight hindered amine has the following general structure:

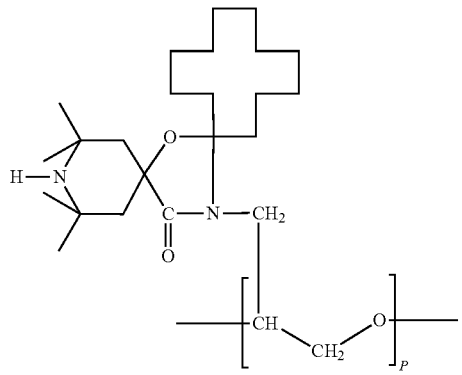

wherein, p is 4 to 30, in some embodiments 4 to 20, and in some embodiments 4 to 10. This oligomeric compound is commercially available from Clariant under the designation Hostavin® N30 and has a number average molecular weight of 1200.

Another suitable high molecular weight hindered amine has the following structure:

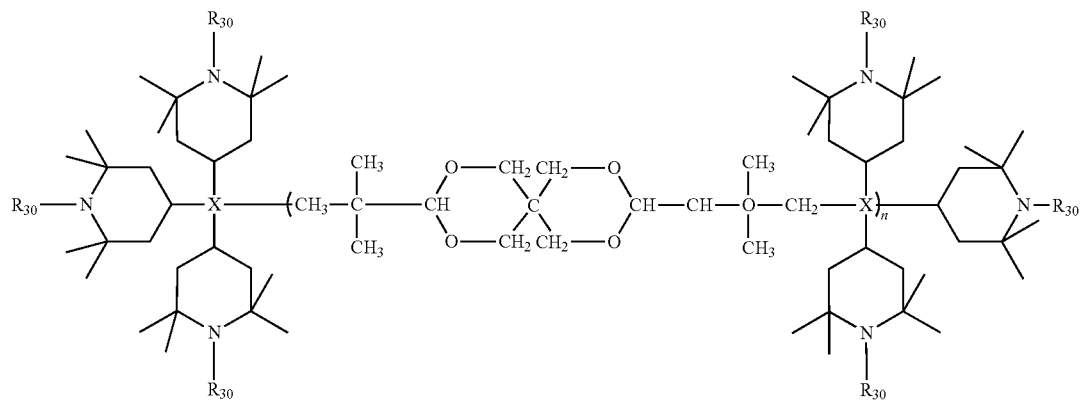

wherein, n is from 1 to 4 and $R_{30}$ is independently hydrogen or $CH_3$. Such oligomeric compounds are commercially available from Adeka Palmarole SAS (joint venture between Adeka Corp. and Palmarole Group) under the designation ADK STAB® LA-63 ($R_{30}$ is $CH_3$) and ADK STAB® LA-68 ($R_{30}$ is hydrogen).

Other examples of suitable high molecular weight hindered amines include, for instance, an oligomer of N-(2-hydroxyethyl)-2,2,6,6-tetramethyl-4-piperidinol and succinic acid (Tinuvin® 622 from Ciba Specialty Chemicals, MW=4000); oligomer of cyanuric acid and N,N-di(2,2,6,6-tetramethyl-4-piperidyl)-hexamethylene diamine; poly((6-morpholine-S-triazine-2,4-diyl)(2,2,6,6-tetramethyl-4-piperidinyl)-iminohexamethylene-(2,2,6,6-tetramethyl-4-piperidinyl)-imino) (Cyasorb® UV 3346 from Cytec, MW=1600); polymethylpropyl-3-oxy-[4(2,2,6,6-tetramethyl)-piperidinylysiloxane (Uvasil® 299 from Great Lakes Chemical; MW=1100 to 2500); copolymer of α-methylstyrene-N-(2,2,6,6-tetramethyl-4-piperidinyl)maleimide and N-stearyl maleimide; tetraoxaspiro[5.5]undecane-3,9-diethanol tetramethyl-polymer with 1,2,3,4-butanetetracarboxylic acid; and so forth. Still other suitable high molecular weight hindered amines are described in U.S. Pat. No. 5,679,733 to Malik, et al. and U.S. Pat. No. 6,414,155 to Sassi, et al., which are incorporated herein in their entirety by reference thereto for all purposes.

In addition to the high molecular hindered amines, low molecular weight hindered amines may also be employed in the composition. Such hindered amines are generally monomeric in nature and have a molecular weight of about 1000 or less, in some embodiments from about 155 to about 800, and in some embodiments, from about 300 to about 800.

Specific examples of such low molecular weight hindered amines may include, for instance, bis-(2,2,6,6-tetramethyl-4-piperidyl) sebacate (Tinuvin® 770 from Ciba Specialty Chemicals, MW=481); bis-(1,2,2,6,6-pentamethyl-4-piperidinyl)-(3,5-ditertbutyl-4-hydroxybenzyl)butyl-propane dioate; bis-(1,2,2,6,6-pentamethyl-4-piperidinyl)sebacate; 8-acetyl-3-dodecyl-7,7,9,9-tetramethyl-1,3,8-triazaspiro-(4,5)-decane-2,4-dione, butanedioic acid-bis-(2,2,6,6-tetramethyl-4-piperidinyl) ester; tetrakis-(2,2,6,6-tetramethyl-4-piperidyl)-1,2,3,4-butane tetracarboxylate; 7-oxa-3,20-diazadispiro(5.1.11.2) heneicosan-20-propanoic acid, 2,2,4,4-tetramethyl-21-oxo, dodecyl ester; N-(2,2,6,6-tetramethyl-4-piperidinyl)-N'-amino-oxamide; o-t-amyl-o-(1,2,2,6,6-pentamethyl-4-piperidinyl)-monoperoxicarbonate, β-alanine, N-(2,2,6,6-tetramethyl-4-piperidinyl), dodecylester; ethanediamide, N-(1-acetyl-2,2,6,6-tetramethylpiperidinyl)-N'-dodecyl; 3-dodecyl-1-(2,2,6,6-tetramethyl-4-piperidinyl)-pyrrolidin-2,5-dione; 3-dodecyl-1-(1,2,2,6,6-pentamethyl-4-piperidinyl)-pyrrolidin-2,5-dione; 3-dodecyl-1-(1-acetyl,2,2,6,6-tetramethyl-4-piperidinyl)-pyrrolidin-2,5-dione, (Sanduvar® 3058 from Clariant, MW=448.7); 4-benzoyloxy-2,2,6,6-tetramethylpiperidine; 1-[2-(3,5-di-tert-butyl-4-hydroxyphenylpropionyloxy) ethyl]-4-(3,5-di-tert-butyl-4-hydroxylphenyl propionyloxy)-2,2,6,6-tetramethyl-piperidine; 2-methyl-2-(2'',2'',6'',6''-tetramethyl-4''-piperidinylamino)-N-(2',2',6',6'-tetra-methyl-4''-piperidinyl)propionylamide; 1,2-bis-(3,3,5,5-tetramethyl-2-oxo-piperazinyl)ethane; 4-oleoyloxy-2,2,6,6-tetramethylpiperidine, and combinations thereof. Other suitable low molecular weight hindered amines are described in U.S. Pat. No. 5,679,733 to Malik, et al.

The hindered amines may be employed singularly or in combination in any amount to achieve the desired properties, but typically constitute from about 0.01 wt. % to about 4 wt. % of the polymer composition.

UV absorbers, such as benzotriazoles or benzopheones, may be employed in the composition to absorb ultraviolet light energy. Suitable benzotriazoles may include, for instance, 2-(2-hydroxyphenyl)benzotriazoles, such as 2-(2-hydroxy-5-methylphenyl)benzotriazole; 2-(2-hydroxy-5-tert-octylphenyl)benzotriazole (Cyasorb® UV 5411 from Cytec); 2-(2-hydroxy-3,5-di-tert-butylphenyl)-5-chlorobenzo-triazole; 2-(2-hydroxy-3-tert-butyl-5-methylphenyl)-5-chlorobenzotriazole, 2-(2-hydroxy-3,5-dicumylphenyl)benzotriazole; 2,2'-methylenebis(4-tert-octyl-6-benzotriazolylphenol); polyethylene glycol ester of 2-(2-hydroxy-3-tert-butyl-5-carboxyphenyl)benzotriazole; 2-[2-hydroxy-3-(2-acryloyloxyethyl)-5-methylphenyl]-benzotriazole; 2-[2-hydroxy-3-(2-methacryloyloxyethyl)-5-tert-butylphenyl]benzotriazole; 2-[2-hydroxy-3-(2-methacryloyloxyethyl)-5-tert-octylphenyl]benzotriazole; 2-[2-hydroxy-3-(2-methacryloyloxyethyl)-5-tert-butylphenyl]-5-chlorobenzotriazole; 2-[2-hydroxy-5-(2-methacryloyloxyethyl)phenyl]benzotriazole; 2-[2-hydroxy-3-tert-butyl-5-(2-methacryloyloxyethyl)phenyl] benzotriazole; 2-[2-hydroxy-3-tert-amyl-5-(2-methacryloyloxyethyl)phenyl]benzotriazole; 2-[2-hydroxy-3-tert-butyl-5-(3-methacryloyloxypropyl)phenyl]-5-chlorobenzotriazole; 2-[2-hydroxy-4-(2-methacryloyloxymethyl)phenypenzotriazole; 2-2-hydroxy-4-(3-methacryloyloxy-2-hydroxypropyl)phenyl benzotriazole; 2-[2-hydroxy-4-(3-methacryloyloxypropyl) phenyl]benzotriazole; and combinations thereof.

Exemplary benzophenone light stabilizers may likewise include 2-hydroxy-4-dodecyloxybenzophenone; 2,4-dihydroxybenzophenone; 2-(4-benzoyl-3-hydroxyphenoxy) ethyl acrylate (Cyasorb® UV 209 from Cytec); 2-hydroxy-4-n-octyloxy)benzophenone (Cyasorb® 531 from Cytec); 2,2'-dihydroxy-4-(octyloxy)benzophenone (Cyasorb® UV 314 from Cytec); hexadecyl-3,5-bis-tert-butyl-4-hydroxybenzoate (Cyasorb® UV 2908 from Cytec); 2,2'-thiobis(4-tert-octylphenolato)-n-butylamine nickel(II) (Cyasorb® UV 1084 from Cytec); 3,5-d-tert-butyl-4-hydroxybenzoic add, (2,4-di-tert-butylphenyl)ester (Cyasorb® 712 from Cytec); 4,4'-dimethoxy-2,2'-dihydroxybenzophenone (Cyasorb® UV 12 from Cytec); and combinations thereof.

When employed, UV absorbers may constitute from about 0.01 wt. % to about 4 wt. % of the entire polymer composition.

In one embodiment, the polymer composition may contain a blend of stabilizers that produce ultraviolet resistance and color stability. The combination of stabilizers may allow for products to be produced that have bright and fluorescent colors. In addition, bright colored products can be produced without experiencing significant color fading over time. In one embodiment, for instance, the polymer composition may contain a combination of a benzotriazole light stabilizer and a hindered amine light stabilizer, such as an oligomeric hindered amine.

Various other stabilizers may also be present in the composition. For instance, in one embodiment, the composition may contain a phosphite, such as a diphosphite. For instance, in one embodiment, the phosphite compound may comprise distearyl pentaerythritol diphosphite. The phosphite compound may also comprise bis(2,4-ditert-butylphenyl)pentaerythritol diphosphite.

Organophosphorus compounds may be employed in the composition that serve as secondary antioxidants to decompose peroxides and hydroperoxides into stable, non-radical products. Trivalent organophosphorous compounds (e.g., phosphites or phosphonites) are particularly useful in the stabilizing system of the present invention. Monophosphite compounds (i.e., only one phosphorus atom per molecule) may be employed in certain embodiments of the present invention. Preferred monophosphites are aryl monophosphites contain $C_1$ to $C_{10}$ alkyl substituents on at least one of the aryloxide groups. These substituents may be linear (as in the case of nonyl substituents) or branched (such as isopropyl or tertiary butyl substituents). Non-limiting examples of suitable aryl monophosphites (or monophosphonites) may include triphenyl phosphite; diphenyl alkyl phosphites; phenyl dialkyl phosphites; tris(nonylphenyl) phosphite (Weston™ 399, available from GE Specialty Chemicals); tris(2,4-di-tert-butylphenyl) phosphite (Irgafos® 168, available from Ciba Specialty Chemicals Corp.); bis(2,4-di-tert-butyl-6-methylphenyl)ethyl phosphite (Irgafos® 38, available from Ciba Specialty Chemicals Corp.); and 2,2',2"-nitrilo[triethyltris(3,3'5,5-tetra-tert-butyl-1,1'-biphenyl-2,2'-diyl) phosphate (Irgafos® 12, available from Ciba Specialty Chemicals Corp.). Aryl diphosphites or diphosphonites (i.e., contains at least two phosphorus atoms per phosphite molecule may also be employed in the stabilizing system and may include, for instance, distearyl pentaerythritol diphosphite, diisodecyl pentaerythritol diphosphite, bis(2,4 di-tert-butylphenyl) pentaerythritol diphosphite (Ultranox™ 626, available from GE Specialty Chemicals); bis(2,6-di-tert-butyl-4-methylpenyl)pentaerythritol diphosphite; bisisodecyloxypentaerythritol diphosphite, bis(2,4-di-tert-butyl-6-methylphenyl)pentaerythritol diphosphite, bis(2,4,6-tri-tert-butylphenyl)pentarythritol diphosphite, tetrakis(2,4-di-tert-butylphenyl)4,4'-biphenylene-diphosphonite (Sandostab™ P-EPQ, available from Clariant) and bis(2,4-dicumylphenyl) pentaerythritol diphosphite (Doverphos® S-9228).

Organophosphorous compounds may constitute from about 0.01 wt. % to about 2 wt. %, in some embodiments from about 0.05 wt. % to about 1 wt. %, and in some embodiments, from about 0.1 wt. % to about 0.5 wt. % of the polymer composition.

In addition to those mentioned above, secondary amines may also be employed in the composition. The secondary amines may be aromatic in nature, such as N-phenyl naphthylamines (e.g., Naugard® PAN from Uniroyal Chemical); diphenylamines, such as 4,4'-bis(dimethylbenzyl)-diphenylamine (e.g., Naugard® 445 from Uniroyal Chemical); p-phenylenediamines (e.g., Wingstay® 300 from Goodyear); quinolones, and so forth. Particularly suitable secondary amines are oligomeric or polymeric amines, such as horno- or copolymerized polyamides. Examples of such polyamides may include nylon 3 (poly-β-alanine), nylon 6, nylon 10, nylon 11, nylon 12, nylon 616, nylon 6/9, nylon 6/10, nylon 6/11. nylon 6112, polyesterarnide, polyarnideirnide, polyacrylamide, and so forth. In one particular embodiment, the amine is a polyimide terpolymer having a melting point in the range from 120° C. to 220° C. Suitable terpolymers may be based on the nylons selected from the group consisting of nylon 6, nylon 6/6, nylon 6/9, nylon 6/10 and nylon 6/12, and may include nylon 6-66-69; nylon 6-66-610 and nylon 6-66-612. One example of such a nylon terpolymer is a terpolymer of nylon 6-66-610 and is commercially available from Du Pont de Nemours under the designation Elvamide® 8063R. Still other suitable amine compounds are described in U.S. Patent Application Publication No. 2003/0060529 to Ho, et al., which is incorporated herein in its entirety by reference thereto for all purposes.

Secondary amines may constitute from about 0.01 wt. % to about 2 wt. %, of the entire polymer composition.

If desired, other known stabilizers may also be incorporated into the composition, such as metal deactivators, acid stabilizers, other light stabilizers (e.g., benzophenones) or antioxidants, etc. Acid stabilizers, for instance, may help neutralize the acidic catalysts or other components present in the polymers. Suitable acid stabilizers may include zinc oxide, calcium lactate, natural and synthetic hydrotalcites, natural and synthetic hydrocalumites, and alkali metal salts and alkaline earth metal salts of higher fatty acids, such as calcium stearate, zinc stearate, magnesium stearate, sodium stearate, sodium ricinoleate and potassium palmitate. When employed, such acid stabilizers typically constitutes about 1.5 wt. % or less, in some embodiments, about 1 wt. % or less, and in some embodiments, from about 0.01 wt. % to about 0.5 wt. % of the polymer composition.

Each stabilizer above may be present in an amount from about 0.01% to about 3% by weight, such as from about 0.05% to about 0.5% by weight. In a preferred embodiment, the composition contains both a heat stabilizer and an antioxidant. For example, the heat stabilizer may comprise a sterically hindered phenolic compound and the antioxidant may comprise a diphosphite.

In addition to any stabilizer present in the composition, the thermoplastic copolyester composition of the present invention may also include a lubricant that constitutes from about 0.01 wt. % to about 2 wt. %, in some embodiments from about 0.1 wt, % to about 1 wt. %, and in some embodiments, from about 0.2 wt. % to about 0.5 wt. % of the polymer composition. The lubricant may be formed from a fatty acid salt derived from fatty acids having a chain length of from 22 to 38 carbon atoms, and in some embodiments, from 24 to 36 carbon atoms. Examples of such fatty acids may include long chain aliphatic fatty acids, such as montanic acid (octacosanoic acid), arachidic acid (arachic acid, icosanic acid, icosanoic acid, n-icosanoic acid), tetracosanoic acid (lignoceric acid), behenic acid (docosanoic acid), hexacosanoic acid (cerotinic acid), melissic acid (triacontanoic acid), erucic acid, cetoleic acid, brassidic acid, selacholeic acid, nervonic acid, etc. For example, montanic acid has an aliphatic carbon chain of 28 atoms and arachidic acid has an aliphatic carbon chain of 20 atoms. Due to the long carbon chain provided by the fatty acid, the lubricant has a high thermostability and low volatility. This allows the lubricant to remain functional during formation of the desired article to reduce internal and external friction, thereby reducing the degradation of the material caused by mechanical/chemical effects.

The fatty acid salt may be formed by saponification of a fatty acid wax to neutralize excess carboxylic acids and form a metal salt. Saponification may occur with a metal hydroxide, such as an alkali metal hydroxide (e.g., sodium hydroxide) or alkaline earth metal hydroxide (e.g., calcium hydroxide). The resulting fatty acid salts typically include an alkali metal (e.g., sodium, potassium, lithium, etc.) or alkaline earth metal (e.g., calcium, magnesium, etc.). Such fatty acid salts generally have an acid value (ASTM D 1386) of about 20 mg KOH/g or less, in some embodiments about 18 mg KOH/g or less, and in some embodiments, from about 1 to about 15 mg KOH/g. Particularly suitable fatty acid salts for use in the present invention are derived from crude montan wax, which contains straight-chain, unbranched monocarboxylic acids with a chain length in the range of $C_{28}$-$C_{32}$. Such montanic acid salts are commercially available from Clariant GmbH under the designations Licomont® CaV 102 (calcium salt of long-chain, linear montanic acids) and Licomont® NaV 101 (sodium salt of long-chain, linear montanic acids).

If desired, fatty acid esters may be used as lubricants. Fatty acid esters may be obtained by oxidative bleaching of a crude natural wax and subsequent esterification of the fatty acids with an alcohol. The alcohol typically has 1 to 4 hydroxyl groups and 2 to 20 carbon atoms. When the alcohol is multifunctional (e.g., 2 to 4 hydroxyl groups), a carbon atom number of 2 to 8 is particularly desired. Particularly suitable multifunctional alcohols may include dihydric alcohol (e.g., ethylene glycol, propylene glycol, butylene glycol, 1,3-propanediol, 1,4-butanediol, 1,6-hexanediol and 1,4-cyclohexanediol), trihydric alcohol (e.g., glycerol and trimethylolpropane), tetrahydric alcohols (e.g., pentaerythritol and erythritol), and so forth. Aromatic alcohols may also be suitable, such as o-, m- and p-tolylcarbinol, chlorobenzyl alcohol, bromobenzyl alcohol, 2,4-dimethylbenzyl alcohol, 3,5-dimethylbenzyl alcohol, 2,3,5-cumobenzyl alcohol, 3,4,5-trimethylbenzyl alcohol, p-cuminyl alcohol, 1,2-phthalyl alcohol, 1,3-bis(hydroxymethyl)benzene, 1,4-bis(hydroxymethyl)benzene, pseudocumenyl glycol, mesitylene glycol and mesitylene glycerol. Particularly suitable fatty acid esters for use in the present invention are derived from montanic waxes. Licowax® OP (Clariant), for instance, contains montanic acids partially esterified with butylene glycol and montanic acids partially saponified with calcium hydroxide. Thus, Licowax® OP contains a mixture of montanic acid esters and calcium montanate. Other montanic acid esters that may be employed include Licowax® E, Licowax® OP, and Licolub®WE 4 (all from Clariant), for instance, are montanic esters obtained as secondary products from the oxidative refining of raw montan wax. Licowax® E and Licolub® WE 4 contain montanic acids esterified with ethylene glycol or glycerine. Still other suitable montan wax derivatives may be described in U.S. Pat. No. 5,096,951, as well as in U.S. Patent Application Publication Nos. 2007/0073007; 2006/0100330; and 2004/0254280, all of which are incorporated herein in their entirety by reference thereto for all purposes.

Other known waxes may also be employed in a lubricant. Amide waxes, for instance, may be employed that are formed by reaction of a fatty acid with a monoamine or diamine (e.g., ethylenediamine) having 2 to 18, especially 2 to 8, carbon atoms. For example, ethylenebisamide wax, which is formed by the amidization reaction of ethylene diamine and a fatty acid, may be employed. The fatty acid may be in the range from $C_{12}$ to $C_{30}$, such as from stearic acid ($C_{18}$ fatty acid) to form ethylenebisstearamide wax. Ethylenebisstearamide wax is commercially available from Lonza, Inc. under the designation Acrawax® C, which has a discrete melt temperature of 142° C. Other ethylenebisamides include the bisamides formed from lauric acid, palmitic acid, oleic acid, linoleic acid, linolenic acid, oleostearic acid, myristic acid and undecalinic acid, Still other suitable amide waxes are N-(2-hydroxyethyl)12-hydroxystearamide and N,N'-(ethylene bis)12-hydroxystearamide, which are commercially available from CasChem, a division of Rutherford Chemicals LLC, under the designations Paricin® 220 and Paricin® 285, respectively.

In one embodiment, the carbon fiber reinforced polymer composition comprises a polybutylene terephthalate polyester, a fatty acid ester, a nucleant, a heat stabilizing agent, and an antioxidant in addition to fibers having a mean fiber length of from about 10 microns to about 1,000 microns. The polybutylene terephthalate may be present in the composition in an amount from about 35% to about 90% by weight. The composition optionally includes a second polyester having a lower crystallinity than the polybutylene terephthalate. In a particularly preferred embodiment, the second, less crystalline polyester is polyethylene terephthalate.

In addition to the above components, the polymer composition may include various other ingredients. Colorants that may be used include any desired inorganic pigments, such as titanium dioxide, ultramarine blue, cobalt blue, and other organic pigments and dyes, such as phthalocyanines, anthraquinones, and the like. Other colorants include carbon black or various other polymer-soluble dyes. The colorants can generally be present in the composition in an amount up to about 2 percent by weight.

The present disclosure may be better understood with reference to the following examples.

EXAMPLES

Various polymer compositions were formulated in accordance with the present disclosure and tested for various properties. The amount of recycled carbon fiber added to the compositions varied. The following results were obtained.

TABLE 1

| Formulation | Norm ISO | Unit | 10% Recycled CF Sample No. | | | | | |
|---|---|---|---|---|---|---|---|---|
| | | | 1 | 2 | 3 | 4 | 5 | 6 |
| Polybutylene Terephthalate MVR38 | | % | 86 | 86 | 85.5 | 85.5 | 71 | 71 |
| Montanic acid triol ester | | % | 0.25 | 0.25 | 0.25 | 0.25 | 0.25 | 0.25 |
| nucleant (Talcum) | | % | 0.15 | 0.15 | 0.15 | 0.15 | 0.15 | 0.15 |
| Pentaerythritol tetrakis(3-(3,5-di-tert-butyl-4-hydroxyphenyl)propionate) | | % | 0.08 | 0.08 | 0.08 | 0.08 | 0.08 | 0.08 |
| Bis-(2, 4-di-t-butylphenol) Pentaerythritol Diphosphite | | % | 0.17 | 0.17 | 0.17 | 0.17 | 0.17 | 0.17 |
| Titanate coupling agent | | % | 0 | 0 | 0.3 | 0.3 | 0 | 0 |
| Polyethylene terephthalate Intrinsic Viscosity 0.77 | | | 0 | 0 | 0 | 0 | 15 | 15 |
| Polybutylene Terephthalate grind | | % | 0.35 | 0.35 | 0.55 | 0.55 | 0.35 | 0.35 |
| Polybutylene Terephthalate 95076 black Masterbatch | | % | 2 | 0 | 2 | 0 | 2 | 0 |
| Polyethylene 950231 black masterbatch | | % | 0 | 2 | 0 | 2 | 0 | 2 |
| recycled carbon fiber r-CF | | % | 11 | 11 | 11 | 11 | 11 | 11 |
| Total | | % | 100 | 100 | 100 | 100 | 100 | 100 |
| ash* | 1172 | % | 12.09 | 12.42 | 12.69 | 11.77 | 12.27 | 14.55 |
| MVR 250° C./2, 16 kg | 1133 | cm$^3$/10 min | 22 | | 21.6 | | 27.2 | |
| Tensile Modulus | 527-1/2 | MPa | 8,896 | 7,540 | 8,759 | 7,757 | 9062 | 8420 |
| Tensile Strength | 527-1/2 | MPa | 118 | 98 | 116 | 98.3 | 118 | 104.6 |
| Elongation @ Break | 527-1/2 | % | 3.6 | 4.4 | 3 | 3.5 | 3.3 | 4.5 |
| Charpy Impact Strength @ 23° C. | 179/1eU | kJ/m$^2$ | 33 | 42.2 | 29 | 41.1 | 29 | 39.5 |
| Density | | g/cm$^3$ | 1.353 | | | | 1.361 | |
| Spec. Surface Resistivity | IEC 60093 | Ohm | 8•E+11 | | | | 4•E+11 | |
| | | | 8•E+11 | | | | 5•E+11 | |
| | | | 4•E+11 | | | | 5•E+11 | |
| Spec. Volume Resistivity | IEC 60093 | Ohm · m | 2•E+04 | | | | 2•E+04 | |
| | | | 9•E+04 | | | | 1•E+04 | |
| | | | 9•E+04 | | | | 1•E+04 | |

TABLE 2

| Formulation | Norm ISO | Unit | 15% Recycled CF Sample No. | | | |
|---|---|---|---|---|---|---|
| | | | 7 | 8 | 9 | 10 |
| Polybutylene Terephthalate MVR38 | | % | 80.5 | 80.5 | 65.5 | 65.5 |
| Montanic acid triol ester | | % | 0.25 | 0.25 | 0.25 | 0.25 |
| nucleant (Talcum) | | % | 0.15 | 0.15 | 0.15 | 0.15 |
| Pentaerythritol tetrakis(3-(3,5-di-tert-butyl-4-hydroxyphenyl)propionate) | | % | 0.08 | 0.08 | 0.08 | 0.08 |
| Bis-(2, 4-di-t-butylphenol) Pentaerythritol Diphosphite | | % | 0.17 | 0.17 | 0.17 | 0.17 |
| Titanate coupling agent | | % | 0 | 0 | 0 | 0 |
| Polyethylene terephthalate Intrinsic Viscosity 0.77 | | | 0 | 0 | 15 | 15 |
| Polybutylene Terephthalate grind | | % | 0.35 | 0.35 | 0.35 | 0.35 |
| Polybutylene Terephthalate 95076 black masterbatch | | % | 2 | 0 | 2 | 0 |
| Polyethylene 950231 black masterbatch | | % | 0 | 2 | 0 | 2 |
| recycled carbon fiber r-CF | | % | 16.5 | 16.5 | 16.5 | 16.5 |
| Total | | % | 100 | 100 | 100 | 100 |
| ash* | 1172 | % | 15.96 | 18.52 | 17.97 | 19.73 |
| MVR 250° C./2, 16 kg | 1133 | cm$^3$/10 min | 18.6 | | 21.5 | |
| Tensile Modulus | 527-1/2 | MPa | 12,462 | 11,271 | 13110 | 12073 |
| Tensile Strength | 527-1/2 | MPa | 139 | 121.4 | 142 | 125 |
| Elongation @ Break | 527-1/2 | % | 3.1 | 3.5 | 3 | 3.7 |
| Charpy Impact Strength @ 23° C. | 179/1eU | kJ/m$^2$ | 47 | 46.3 | 47.9 | 51.1 |
| Density | | g/cm$^3$ | 1.372 | | 1.376 | |

TABLE 2-continued

| Formulation | Norm ISO | Unit | 15% Recycled CF Sample No. | | | |
|---|---|---|---|---|---|---|
| | | | 7 | 8 | 9 | 10 |
| Spec. Surface Resistivity | IEC 60093 | Ohm | 8•E+03 | | 4•E+04 | |
| | IEC 60093 | Ohm | 6•E+03 | | 6•E+04 | |
| | IEC 60093 | Ohm | 7•E+03 | | 1•E+05 | |
| Spec. Volume Resistivity | IEC 60093 | Ohm · m | 4•E+01 | | 2•E+02 | |
| | IEC 60093 | Ohm · m | 4•E+01 | | 2•E+02 | |
| | IEC 60093 | Ohm · m | 4•E+01 | | 2•E+02 | |

TABLE 3

| Formulation | Norm ISO | Unit | 20% Recycled CF Sample No. | | | | | |
|---|---|---|---|---|---|---|---|---|
| | | | 11 | 12 | 13 | 14 | 15 | 16 |
| Polybutylene Terephthalate MVR38 | | % | 75 | 75 | 75 | 55 | 55 | 55 |
| Montanic acid triol ester | | % | 0.25 | 0.25 | 0.25 | 0.25 | 0.25 | 0.25 |
| nucleant (Talcum) | | % | 0.15 | 0.15 | 0.15 | 0.15 | 0.15 | 0.15 |
| Pentaerythritol tetrakis(3-(3,5-di-tert-butyl-4-hydroxyphenyl)propionate) | | % | 0.08 | 0.08 | 0.08 | 0.08 | 0.08 | 0.08 |
| Bis-(2, 4-di-t-butylphenol) Pentaerythritol Diphosphite | | % | 0.17 | 0.17 | 0.17 | 0.17 | 0.17 | 0.17 |
| Polyethylene terephthalate Intrinsic Viscosity 0.77 | | % | 0 | 0 | 0 | 20 | 20 | 20 |
| Polybutylene Terephthalate grind | | % | 0.35 | 0.35 | 0.35 | 0.35 | 0.35 | 0.35 |
| Polybutylene Terephthalate 95076 black masterbatch | | % | 2 | 0 | 0 | 2 | 0 | 0 |
| Polyethylene 950231 black masterbatch | | % | 0 | 2 | 2 | 0 | 2 | 2 |
| recycled carbon fiber r-CF | | % | 22 | 22 | 22 | 22 | 22 | 22 |
| Total | | % | 100 | 100 | 100 | 100 | 100 | 100 |
| ash* | 1172 | % | 22.48 | 22.87 | 23.4 | 23.6 | 23.94 | 25.12 |
| MVR 250° C./2, 16 kg | 1133 | cm$^3$/10 min | 14.7 | | | 17.1 | | |
| Tensile Modulus | 527-1/2 | MPa | 16,730 | 14,806 | 15,992 | 17,145 | 14,972 | 16,930 |
| Tensile Strength | 527-1/2 | MPa | 158 | 140.3 | 156 | 163 | 142.3 | 160 |
| Elongation @ Break | 527-1/2 | % | 2.3 | 2.6 | 2.8 | 2.5 | 3 | 2.8 |
| Charpy Impact Strength @23° C. | 179/1eU | kJ/m$^2$ | 48 | 48.3 | 52 | 51 | 53.4 | 53 |
| Density | | g/cm$^3$ | 1.393 | | 1.400 | 1.405 | | 1.400 |
| Spec. Surface Resistivity | IEC 60093 | | 4•E+01 | | | 1•E+03 | | |
| | | Ohm | 4•E+01 | | | 1•E+03 | | |
| | | | 4•E+01 | | | 1•E+03 | | |
| Spec. Volume Resistivity | IEC 60093 | | 3•E+00 | | | 6•E+00 | | |
| | | Ohm · m | 3•E+00 | | | 6•E+00 | | |
| | | | 3•E+00 | | | 7•E+00 | | |

TABLE 4

| Formulation | Norm ISO | Unit | 30% Recycled CF Sample No. | | | | | |
|---|---|---|---|---|---|---|---|---|
| | | | 17 | 18 | 19 | 20 | 20 | 22 |
| Polybutylene Terephthalate MVR38 | | % | 64 | 64 | 64 | 39 | 39 | 39 |
| Montanic acid triol ester | | % | 0.25 | 0.25 | 0.25 | 0.25 | 0.25 | 0.25 |
| nucleant (Talcum) | | % | 0.15 | 0.15 | 0.15 | 0.15 | 0.15 | 0.15 |
| Pentaerythritol tetrakis(3-(3,5-di-tert-butyl-4-hydroxyphenyl)propionate) | | % | 0.08 | 0.08 | 0.08 | 0.08 | 0.08 | 0.08 |
| Bis-(2, 4-di-t-butylphenol) Pentaerythritol Diphosphite | | % | 0.17 | 0.17 | 0.17 | 0.17 | 0.17 | 0.17 |
| Polyethylene terephthalate Intrinsic Viscosity 0.77 | | % | 0 | 0 | 0 | 25 | 25 | 25 |
| Polybutylene Terephthalate grind | | % | 0.35 | 0.35 | 0.35 | 0.35 | 0.35 | 0.35 |

TABLE 4-continued

| Formulation | Norm ISO | Unit | 30% Recycled CF Sample No. | | | | | |
|---|---|---|---|---|---|---|---|---|
| | | | 17 | 18 | 19 | 20 | 20 | 22 |
| Polybutylene Terephthalate 95076 black masterbatch | | % | 2 | 0 | 0 | 2 | 0 | 0 |
| Polyethylene 950231 black masterbatch | | % | 0 | 2 | 2 | 0 | 2 | 2 |
| recycled CF | | % | 33 | 33 | 33 | 33 | 33 | 33 |
| Total | | % | 100 | 100 | 100 | 100 | 100 | 100 |
| ash* | 1172 | % | 32.52 | 34.11 | 33.73 | 34.26 | 34.98 | 35.3 |
| MVR 250° C./2, 16 kg | 1133 | cm³/10 min | 9.7 | | | 10.4 | | |
| Tensile Modulus | 527-1/2 | MPa | 24,272 | 22,679 | 23,338 | 25,400 | 23,345 | 24,718 |
| Tensile Strength | 527-1/2 | MPa | 180 | 164.2 | 180 | 191 | 173.7 | 186 |
| Elongation @ Break | 527-1/2 | % | 1.5 | 1.5 | 1.9 | 1.7 | 1.8 | 1.8 |
| Charpy Impact Strength @ 23° C. | 179/1eU | kJ/m² | 49 | 47.9 | 55 | 54.4 | 55 | 57 |
| Density | | g/cm³ | 1.432 | | 1.440 | 1.452 | | 1.440 |
| Spec. Surface Resistivity | IEC 60093 | Ohm | 4•E+01 | | | 6•E+01 | | |
| | | | 4•E+01 | | | 6•E+01 | | |
| | | | 4•E+01 | | | 7•E+01 | | |
| Spec. Volume Resistivity | IEC 60093 | Ohm · m | 4•E−01 | | | 8•E−01 | | |
| | | | 5•E−01 | | | 8•E−01 | | |
| | | | 4•E−01 | | | 8•E−01 | | |

TABLE 5

| Formulation | Norm ISO | Unit | 40% Recycled CF Sample No. | | | | | |
|---|---|---|---|---|---|---|---|---|
| | | | 23 | 24 | 25 | 26 | 27 | 28 |
| Polybutylene Terephthalate MVR38 | | % | 53 | 53 | 53 | 23 | 23 | 23 |
| Montanic acid triol ester | | % | 0.25 | 0.25 | 0.25 | 0.25 | 0.25 | 0.25 |
| nucleant (Talcum) | | % | 0.15 | 0.15 | 0.15 | 0.15 | 0.15 | 0.15 |
| Pentaerythritol tetrakis(3-(3,5-di-tert-butyl-4-hydroxyphenyl)propionate) | | % | 0.08 | 0.08 | 0.08 | 0.08 | 0.08 | 0.08 |
| Bis-(2, 4-di-t-butylphenol) Pentaerythritol Diphosphite | | % | 0.17 | 0.17 | 0.17 | 0.17 | 0.17 | 0.17 |
| Polyethylene terephthalate Intrinsic Viscosity 0.77 | | % | 0 | 0 | 0 | 30 | 30 | 30 |
| Polybutylene Terephthalate grind | | % | 0.35 | 0.35 | 0.35 | 0.35 | 0.35 | 0.35 |
| Polybutylene Terephthalate 95076 black masterbatch | | % | 2 | 0 | 0 | 2 | 0 | 0 |
| Polyethylene 950231 black masterbatch | | % | 0 | 2 | 2 | 0 | 2 | 2 |
| recycled carbon fiber r-CF | | % | 44 | 44 | 44 | 44 | 44 | 44 |
| Total | | % | 100 | 100 | 100 | 100 | 100 | 100 |
| ash* | 1172 | % | 43.75 | 43.55 | 43.86 | 45.6 | 45.06 | 45.09 |
| MVR 250° C./2, 16 kg | 1133 | cm³/10 min | 5.4 | | | 6.9 | | |
| Tensile Modulus | 527-1/2 | MPa | 31,596 | 29,669 | 31,787 | 33,937 | 32,039 | 32,371 |
| Tensile Strength | 527-1/2 | MPa | 182 | 171.2 | 189 | 204 | 187.2 | 191 |
| Elongation @ Break | 527-1/2 | % | 1 | 1 | 1.1 | 1 | 1.1 | 1.1 |
| Charpy Impact Strength @ 23° C. | 179/1eU | kJ/m² | 43 | 43.6 | 55 | 49 | 48.3 | 52 |
| Density | | g/cm³ | 1.481 | | 1.480 | 1.503 | | 1.480 |
| Spec. Surface Resistivity | IEC 60093 | Ohm | 2•E+01 | | | 3•E+01 | | |
| | | | 2•E+01 | | | 3•E+01 | | |
| | | | 2•E+01 | | | 3•E+01 | | |
| Spec. Volume Resistivity | IEC 60093 | Ohm · m | 2•E−01 | | | 3•E−01 | | |
| | | | 3•E−01 | | | 4•E−01 | | |
| | | | 2•E−01 | | | 4•E−01 | | |

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A reinforced polymer composition comprising:
a polyester polymer comprising a polybutylene terephthalate polymer;
a fatty acid ester blended with the polyester polymer;
a nucleant blended with the polyester polymer;
a heat stabilizing agent and an antioxidant blended with the polyester polymer; and
carbon fibers combined with the polyester polymer, the carbon fibers being present in the polymer composition in an amount from about 5% to about 50% by weight, wherein the carbon fibers are substantially free of a sizing agent, the carbon fibers having a mean fiber length of from about 50 microns to about 500 microns.

2. A reinforced polymer composition as defined in claim 1, further comprising a second polyester polymer, the second polyester polymer being less crystalline than the polybutylene terephthalate polymer.

3. A reinforced polymer composition as defined in claim 2, wherein the second polyester polymer has a crystallinity of less than about 40%.

4. A reinforced polymer composition as defined in claim 2, wherein the second polyester polymer comprises polyethylene terephthalate.

5. A reinforced polymer composition as defined in claim 1, wherein the fatty acid ester comprises an ester of montanic acid.

6. A reinforced polymer composition as defined in claim 1, wherein the nucleant comprises talc and wherein the nucleant is present in the composition in an amount from about 0.001% to about 0.5% by weight.

7. A reinforced polymer composition as defined in claim 1, wherein the heat stabilizer comprises a diphosphite or triphosphite and wherein the antioxidant comprises a sterically hindered phenolic compound.

8. A reinforced polymer composition as defined in claim 1, wherein the polybutylene terephthalate polymer is present in the composition in an amount from about 20% to about 90% by weight.

9. A reinforced polymer composition as defined in claim 1, wherein the carbon fibers have a mean fiber length of from about 50 microns to about 200 microns, and wherein the carbon fibers are present in the composition in an amount from about 10% to about 45% by weight.

10. A reinforced polymer composition as defined in claim 1, wherein the polyester polymer has a crystallinity of greater than about 40%.

11. A reinforced polymer composition as defined in claim 1, wherein the composition is in a compounded form.

* * * * *